Patented Feb. 15, 1938

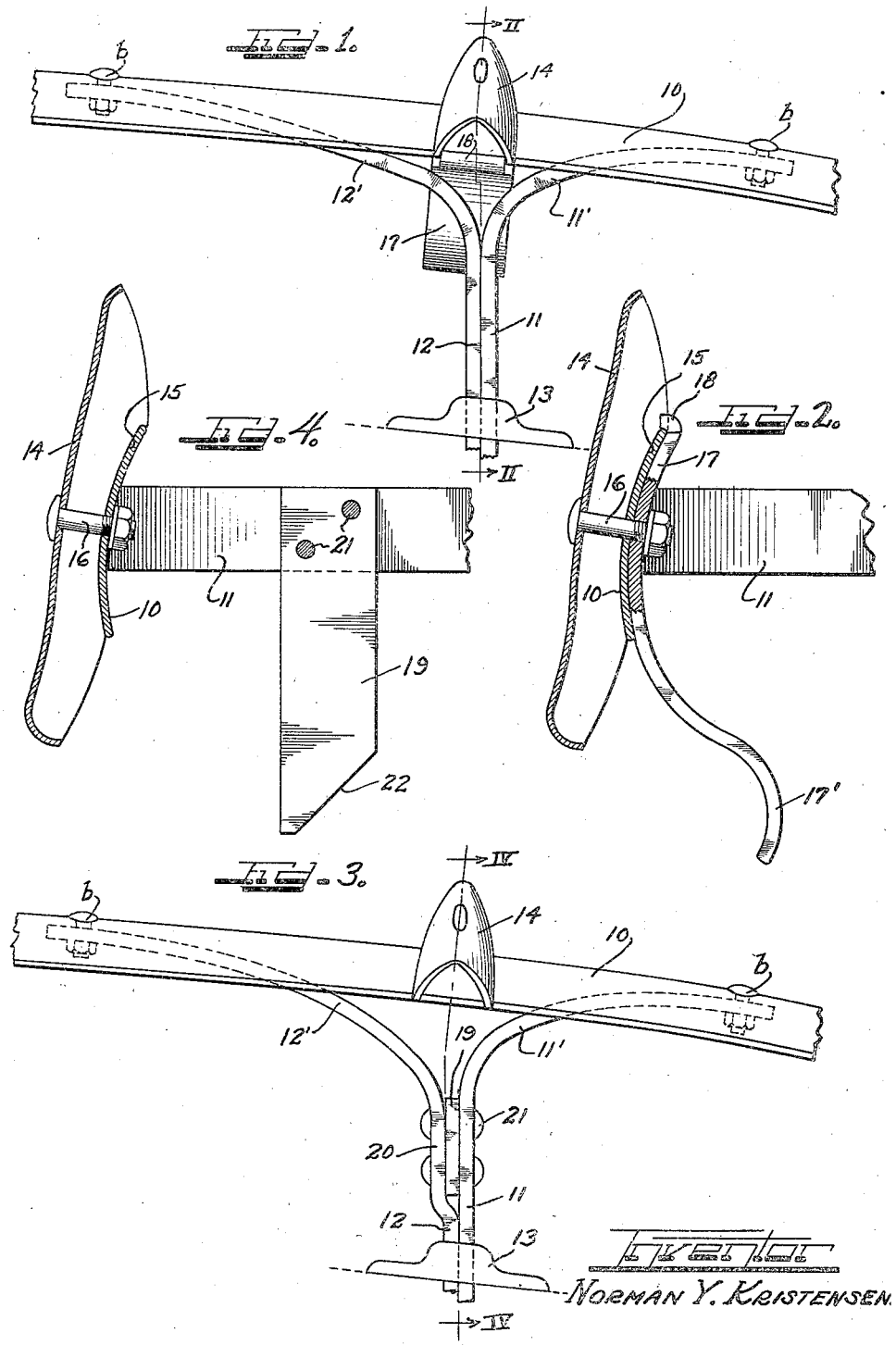

2,108,129

UNITED STATES PATENT OFFICE

2,108,129

BUMPER GUARD STRUCTURE

Norman Y. Kristensen, Detroit, Mich., assignor to Oakes Products Corporation, Detroit, Mich., a corporation of Michigan Application April 5, 1937, Serial No. 135,006

9 Claims. (Cl. 293—55)

My invention relates to bumper guard structure for automobiles and is adapted particularly for preventing interlocked bumpers from reaching and damaging the fenders of the automobiles. Bumper guards are usually secured to the impact bar of a bumper structure to be in front thereof and to extend a distance above and below the impact bar. Even with these bumper guards, it frequently happens that the bumper bar on one car will pass below the bumper guards on the bumper bar at the rear of another car and, unless stopped, will strike and damage the rear fenders of the other car which fenders usually extend downwardly a distance below the rear bumper bar. The guards on the rear bumper bar might be made longer to extend downwardly further so as to prevent such bumper interlock, but, as the rear bumper bars are a considerable distance rearwardly of the rear axle of the car, such lengthened guards might interfere on curbs and driveways when the car is ascending a slight grade. It is therefore the object of my invention to provide auxiliary guard or stop means for preventing a bumper bar, which may have passed below the guards on a rear bumper bar, from reaching the fenders. Such auxiliary means are located between the bumper bar and the fenders, but a distance forwardly of the bumper bar and with their ends extended downwardly below the level of the lower ends of the guards on the bumper bar in which position the auxiliary means will not interfere with curbs or driveways and will stop the bumper bar of another car from reaching the fenders.

The various features of my invention are incorporated in the structure shown on the drawing. In this drawing:

Figure 1 is a plan view of one end of a bumper structure with a regular bumper guard applied to the bumper bar and an auxiliary guard or stop bar associated with the regular guard;

Figure 2 is a section on plane II—II Figure 1;

Figure 3 is a plan view like Figure 1 but showing a modified arrangement; and

Figure 4 is a section on plane IV—IV Figure 3.

The bumper structure shown on Figure 1 comprises the impact bar 10 and supporting bars 11 and 12 extending from a fitting 13 secured to the vehicle chassis, these supporting bars extending parallel outwardly a distance and having their ends 11' and 12' deflected laterally in opposite directions to be secured to the impact bar as by bolts b.

The regular guard members 14 are secured to the bumper bar between the outer ends of the supporting bars, the guard members being in the form of hollow bodies of generally V-shaped cross-section and with the margins or sides thereof having the recesses 15 for receiving the bumper bar against the front face thereof. The guard bodies are secured as by bolt 16 extending therethrough and through suitable bolt holes in the bumper bar.

It may happen that the bumper bar on another car will pass beneath the lower ends of the guards 14 on a rear bumper bar of a car, and unless stopped it will reach and damage the rear fenders. The guards 14 might be lengthened to extend down further below the bumper bar 10 but as the rear bumper bar is a considerable distance rearwardly of the rear axle of the car, such lengthened guards might strike the ground or interfere on curbs and driveways as the car is ascending a slight grade. In accordance with my invention, I apply auxiliary guard or stop means presenting an impact or stop portion at a point between the guard 14 and the rear fender and extending below the level of the lower end of the guard 14 so as to receive and stop a bumper which may pass beneath the guard. In the arrangement shown in Figures 1 and 2, such auxiliary guard or stop means comprises a spring steel bar 17 secured against the inner side of the bumper bar with its lower portion extending forwardly and its tip portion 17' returned rearwardly so that its lower end is a substantial distance forwardly of the regular bumper guard 14 and a sufficient distance below the end of the regular guard to be disposed in front of the rear fender to receive and stop the bumper of another car which may have passed underneath the regular guard.

The upper portion of the bar 17 may be shaped to fit against the rear face of the bumper bar 10 and it may be secured to the bumper bar by the same means 16 which secures the regular guard to the bumper bar. In order to hold the auxiliary bar 17 aligned with the regular guard, the upper end portion 18 of the bar may be of reduced width and deflected so as to engage around the upper edge of the bumper bar and to extend between the side walls or margins of the regular guard.

As the auxiliary guard bar has its lower end much closer to the rear axle of the vehicle than the lower end of the regular guard, it may extend farther downwardly without danger of striking the ground or interfering with curbs or elevations in the roadway, and as the auxiliary bar is of steel spring it will yield and absorb the shock of contact with the bumper bar of another car, and it will also readily flex in the event that it should engage with the ground during abnormal road conditions.

Instead of having the auxiliary guard supported from the bumper bar, it may be supported at some other point on the bumper structure or vehicle structure. In the arrangement of Figures 3 and 4, the auxiliary guard is shown in the form of a steel plate or bar 19 extending downwardly from the supporting bar structure 11 and 12 for the impact bar. In order to accommodate the auxiliary guard bar, the inner supporting bar 12 may be deflected a sufficient distance from the supporting bar 11 as indicated at 20, to provide space for receiving the upper end of the auxiliary guard between the supporting bars, and bolts or rivets 21 may then be employed extending through the supporting bars and the guard bar to form a rigid connection. The guard bar 19 is forwardly of the bumper bar 10 and comparatively close to the rear fenders of the car and extends downwardly below the lower end of the regular guard 14 so as to receive the bumper of another car which may pass underneath the guard 14. In order that the auxiliary guard bar may pass more readily over any road obstruction which it may encounter, the lower forward corner is cut away to leave the beveled edge 22.

I have shown practical and efficient embodiment of the various features of my invention but I do not desire to be limited to the exact construction and arrangement shown and described as changes and modifications may be made without departing from the scope of the invention.

I claim as follows:

1. In bumper structure for automobiles, a horizontally extending bumper impact bar, supporting bars securing the impact bar to the automobile frame, bumper guards secured to the bumper impact bar and extending crosswise thereof, and auxiliary bumper guards displaced from the bumper bar guards toward the vehicle wheels and extending a distance downwardly below the bumper bar guards to prevent bumper bars on other cars passing below the bumper bar guards from reaching the vehicle fenders.

2. In bumper guard structure for automobiles, a horizontally extending bumper bar, means for securing the bumper bar to an automobile body, and a bumper guard assembly comprising a main bumper guard secured to the bumper bar to extend crosswise thereof, and an auxiliary guard displaced from the main guard toward the vehicle wheels and extending downward a distance below the lower end of the main guard to provide a stop for bumpers on other automobiles which may have passed beneath the main guard.

3. In bumper structure for automobiles comprising a bumper bar and support therefor and main bumper guards on the bumper bar extending crosswise thereof, auxiliary bumper guards secured to the bumper structure and having portions displaced from the main guard toward the wheels of the automobile and extended downwardly a distance below the lower ends of the main guards to serve as stops for bumpers of automobiles which may have passed beneath the main guards whereby to prevent engagement of said other automobile bumper bars with the automobile fenders.

4. In bumper structure for automobiles comprising a bumper impact bar and supporting means therefor and main bumper guards on the bumper bar extending crosswise thereof, auxiliary bumper guards secured to the bumper structure behind the main guards with their lower portions displaced from the main guards toward the automobile wheels and extending downwardly a distance below the lower ends of the main guards to provide stops for bumper bars on other automobiles which may have passed beneath the main guards.

5. Bumper structure for automobiles comprising a horizontally extending bumper impact bar, means for supporting said bumper bar on an automobile frame, main bumper guards mounted on the bumper bar to extend crosswise thereof, and an auxiliary bumper guard associated with each main guard and secured to the bumper bar, said auxiliary guards having their lower portions deflected away from the associated main guards and toward the vehicle wheels and extending downwardly a distance below the lower ends of the main guards to serve as stops for bumper bars on other automobiles which may have passed beneath the main guards.

6. In a bumper structure for automobiles, a horizontally extending bumper impact bar, supporting means for supporting the bumper bar on an automobile, a main bumper guard on said bumper bar extending crosswise across the front thereof, an auxiliary bumper guard engaging the rear side of the bumper bar, a common means securing said main guard and auxiliary guard to the bumper bar, the lower portion of the auxiliary guard deflecting away from the main guard and toward the vehicle wheels and extending downwardly a distance below the lower end of the main guard to provide a stop for bumper bars of automobiles which may have passed beneath the main guard.

7. An automobile bumper structure comprising a bumper impact bar, supporting means for securing said impact bar to an automobile body, main guards entirely independent of said supporting means secured to said bumper bar to extend crosswise thereof, and auxiliary guards secured to said structure with their lower ends a distance behind and below the lower ends of said main guards whereby to form stops for bumper bars of other automobiles which may have passed below and beyond the lower ends of said main guards.

8. In bumper structure for automobiles comprising a bumper impact bar and supporting means therefor and main bumper guards on the bumper bar extending crosswise thereof, auxiliary bumper guards depending from said structure with their lower ends a distance behind and below the lower ends of said main guards to provide stops for bumper bars on other automobiles which may have passed beneath and beyond the main guards.

9. Bumper structure for automobiles comprising a horizontally extending bumper impact bar, supporting means for supporting said bar on an automobile frame, main bumper guards on the bumper bar extending crosswise thereof, and auxiliary bumper guards depending from said supporting means with their lower ends displaced from and extending below the lower ends of said main guards whereby to provide stops for bumper bars on other automobiles which may have passed beneath and beyond the lower ends of the main guards.

NORMAN Y. KRISTENSEN.